US012133047B2

(12) United States Patent
Slotte

(10) Patent No.: US 12,133,047 B2
(45) Date of Patent: Oct. 29, 2024

(54) SPEAKER AND ELECTRONIC DEVICE

(71) Applicant: AAC Microtech (Changzhou) Co., Ltd., Changzhou (CN)

(72) Inventor: Benedict Slotte, Tampere (FI)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 218 days.

(21) Appl. No.: 17/881,662

(22) Filed: Aug. 5, 2022

(65) Prior Publication Data

US 2024/0048898 A1 Feb. 8, 2024

(51) Int. Cl.
*H04R 1/28* (2006.01)

(52) U.S. Cl.
CPC .................................... *H04R 1/288* (2013.01)

(58) Field of Classification Search
CPC .............................. H04R 1/283; H04R 1/2834
See application file for complete search history.

(56) References Cited

U.S. PATENT DOCUMENTS

| | | | | |
|---|---|---|---|---|
| 2,811,215 A * | 10/1957 | Rudd | H04R 1/2834 181/154 |
| 2020/0045407 A1* | 2/2020 | Wu | H04R 1/023 |
| 2020/0045408 A1* | 2/2020 | Wu | H04R 1/288 |
| 2020/0169816 A1* | 5/2020 | Kim | G06F 1/1658 |

* cited by examiner

*Primary Examiner* — Mark Fischer
(74) *Attorney, Agent, or Firm* — W&G Law Group

(57) ABSTRACT

Provided are a speaker and an electronic device. The speaker includes: a speaker case; a speaker body arranged in the speaker case and configured to vibrate and produce sound, the speaker body dividing the speaker case into a front sound cavity and a rear sound cavity, the speaker case being provided with a speaker hole, and the front sound cavity communicating with outside of the speaker case through the speaker hole; and a resonator arranged at the speaker case, a side of the resonator being arranged corresponding to the front sound cavity, and another side of the resonator being exposed to outside of the speaker case. By coupling the resonator in the front sound cavity of the speaker, the high frequency reproduction of the speaker is improved and the intermodulation distortion of the speaker is reduced, thereby improving the sound quality of the speaker in the electronic device.

11 Claims, 8 Drawing Sheets

A–A

SPEAKER AND ELECTRONIC DEVICE

TECHNICAL FIELD

The present invention relates to the technical field of electro-acoustic conversion, in particular to a speaker and an electronic device.

BACKGROUND

For an electronic device such as a speaker in the related art, a sound port of the speaker with the existing size cannot work well at a highest audio frequency due to various limitations of the mechanical and industrial design. The range from 10 kHz to 20 kHz is especially problematic, since a portion of the audio range is heavily suppressed, an audio performance for the speaker is reduced.

SUMMARY

The present invention provides a speaker and an electronic device, aiming to solve the technical problems in the related art. The present invention can improve the audio output of the speaker at the highest audio frequency, thereby improving the sound quality.

An embodiment of the present invention provides a speaker, including: a speaker case; a speaker body arranged in the speaker case and configured to vibrate and produce sound, the speaker body dividing the speaker case into a front sound cavity and a rear sound cavity, the speaker case being provided with a speaker hole, and the front sound cavity communicating with outside of the speaker case through the speaker hole; and a resonator arranged at the speaker case, a side of the resonator being arranged corresponding to the front sound cavity, and another side of the resonator being exposed to outside of the speaker case.

As an improvement, the speaker hole is located in a direction normal to a vibration direction of the speaker body, and the resonator is arranged close to the speaker body and away from the speaker hole.

As an improvement, the resonator is located in a direction normal to the vibration direction of the speaker body, and the speaker hole and the resonator are arranged at two opposite sides of the speaker case.

As an improvement, in the direction normal to the vibration direction of the speaker body, an orthographic projection of the speaker hole onto the speaker case completely falls within an orthographic projection of the resonator onto the speaker case.

As an improvement, the resonator is located in the vibration direction of the speaker body, and is arranged opposite to the speaker body.

As an improvement, a predetermined angle is formed between an extension direction of the resonator and the vibration direction of the speaker body.

As an improvement, a plurality of resonators is provided.

As an improvement, the speaker is provided with a sound-absorbing material.

As an improvement, the resonator is protected by a protection member that provides acoustic damping.

As an improvement, the protection member is a mesh.

An embodiment of the present invention further provides an electronic device, including: a housing provided with a sound-outlet hole; and the speaker described above. The sound-outlet hole is arranged opposite to and communicates with the speaker hole.

Compared with the related art, by coupling the resonator in the front sound cavity of the speaker in the present invention, the high frequency reproduction of the speaker is improved and the intermodulation distortion of the speaker is reduced, thereby improving the sound quality of the speaker in the electronic device.

REFERENCE NUMERALS

Figure 1:
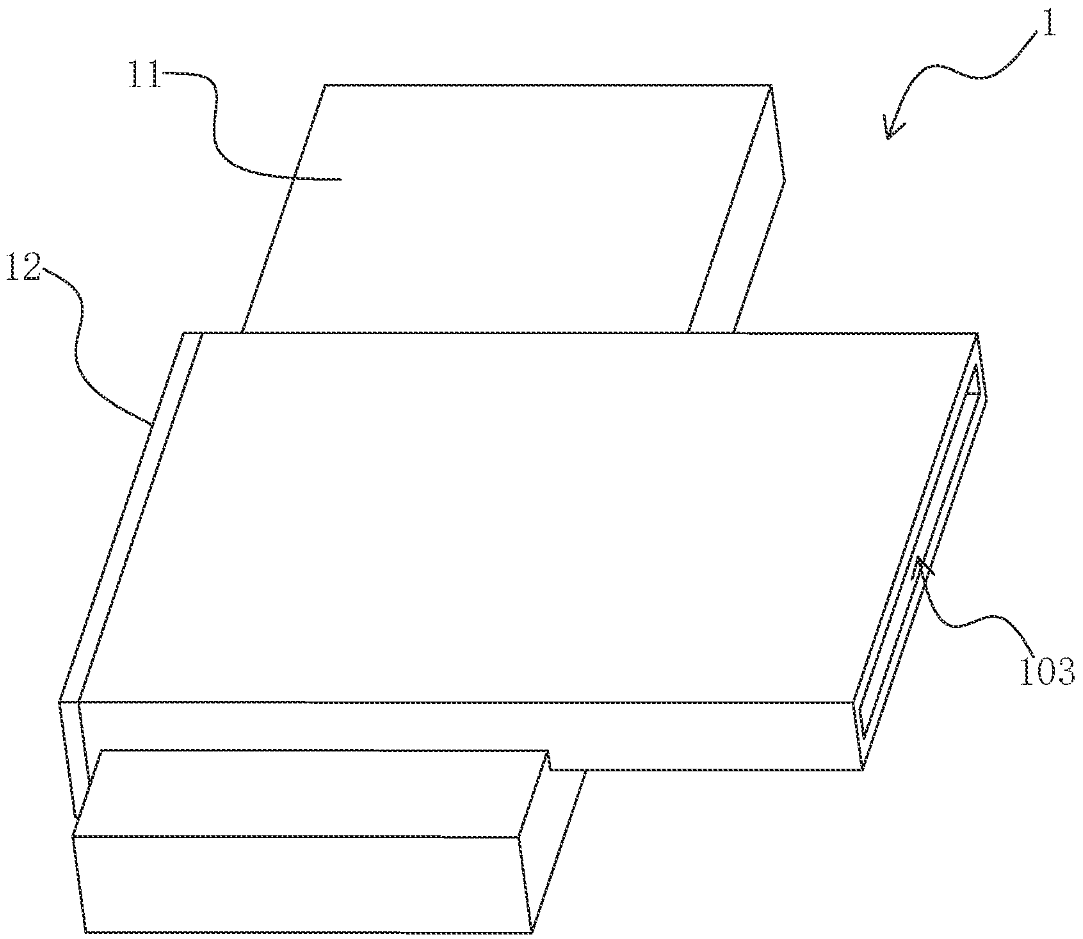
FIG. 1 illustrates an axonometric view of a speaker of a first structure according to an embodiment of the present invention.

- 1: speaker;
  - 10: speaker case;
    - 101: front sound cavity;
    - 102: rear sound cavity;
    - 103—speaker hole;
  - 11: speaker body;
  - 12: resonator;
    - 121: base;
    - 122: composite membrane;
- 2: electronic device;
  - 21: housing;
  - 22: sound-outlet hole;
- L1: first direction;
- L2: second direction.

DESCRIPTION OF EMBODIMENTS

The following describe the embodiments of the present invention, examples of which are illustrated in the accompanying drawings. Herein, the same or similar reference numerals refer to the same or similar elements or elements having the same or similar functions. The embodiments described in the following with reference to the accompanying drawings are exemplary and are merely used to explain the present invention, but not to be construed as a limitation of the present invention.

In the related art, a speaker provided in an electronic device lacks good output at the highest audio frequencies. There are several solutions, such as making a sound port as short as possible, and/or making an outer end as wide as possible, or, the sound port being thinned in such a manner that its outer end is wider than its inner end and a total opening area of a case of the electronic device is increased.

However, these solutions are not always possible because it may require too much space, but there are areas in the electronic device where space cannot be allocated. In most cases, due to market requirements for mechanical and industrial design, the above solutions are often not realized, the sound port may be quite long, and/or an area of the sound port at a visible surface of the case of the electronic device may be too small to achieve a desired high-frequency output.

Regarding the above problems, please refer to FIG. 1 to FIG. 12, an embodiment of the present invention provides a speaker 1, including a speaker case 10, a speaker body 11, and a resonator 12.

The speaker case 10 has an inner cavity to receive the speaker body 11, and the speaker body 11 is configured to vibrate and produce sound. In a possible implementation manner, the speaker body 11 may include structures such as a diaphragm, a voice coil, and a magnetic circuit unit. Under an action of the magnetic circuit unit, the voice coil with changing current is vibrated by an ampere force of different magnitudes. The vibration of the voice coil drives the diaphragm to vibrate, and the vibration of the diaphragm causes the surrounding air to vibrate, thereby producing sound.

The speaker body 11 divides the inner cavity of the speaker case 10 into a front sound cavity 101 and a rear sound cavity 102. In an embodiment of the present invention, a vibration direction of the speaker body 11 is defined as a first direction L1, and a direction normal to the vibration direction of the speaker body 11 is defined as a second direction L2. The first direction L1 and the second direction L2 are perpendicular to each other. A main portion of the front sound cavity 101 extends generally along the second direction L2.

The speaker case 10 is provided with a speaker hole 103. In a possible implementation manner, the speaker hole 103 is a flattened strip-hole, and the front sound cavity 101 communicates with the outside of the speaker case 10 through the speaker hole 103, to transmit the sound resulted from the vibration of the speaker body 11 to the outside. The speaker hole 103 matches a position, a shape and a size of a sound-outlet hole 22 of the electronic device 2 mentioned later. Those skilled in the art should understand that the position, the shape and the size of the speaker hole 103 can be adapted according to actual requirements.

The resonator 12 is arranged at the speaker case 10. A side of the resonator 12 is arranged corresponding to the front sound cavity 101, and is coupled with the front sound cavity 101, so that the resonator 12 is on a propagation path of the sound wave. Another side of the resonator 12 is exposed to the outside of the speaker case 10.

In a possible implementation manner, the resonator 12 includes a base 121 and a composite membrane 122 provided on the base 121. The composite membrane 122 includes a first electrode, a piezoelectric functional film, a second electrode, and a frequency modulator that are sequentially arranged along a thickness direction of the base 121.

In another possible implementation manner, the resonator 12 is entirely passive and therefore does not need any electrodes, and can be made of any material that has suitable mechanical properties.

The resonator 12 is coupled into the front sound cavity 101 to provide acoustic impedance in the front sound cavity 101. The acoustic impedance is matched as an impedance for a plane acoustic wave propagating along the front sound cavity 101 to attenuate high modes in a direction of an axis of the front sound cavity 101. Further, the resonator 12 is configured to concentrate this attenuation effect at high frequencies.

Mechanically, a desired resistance can be achieved by choosing appropriate damping parameters for the composite membrane 122 of the resonator 12. The resonator 12 also naturally produces acoustic capacitance, which is selected in such a manner that the attenuation effect is concentrated only at high frequencies. This can be solved by appropriately selecting the stiffness of the composite membrane 122 of the resonator 12.

The resonator 12 will unavoidably also create some acoustic mass. This part of the resultant acoustic impedance is less desired, and can be minimized by making the composite membrane 122 of the resonator 12 very light. In some cases, however, the additional acoustic mass can be allowed to be somewhat higher in order to fine-tune the behaviour of the high frequency region.

In this embodiment of the present invention, by coupling the resonator 12 in the front sound cavity 101 of the speaker 1, the high frequency reproduction of the speaker 1 is improved and the intermodulation distortion of the speaker 1 is reduced, thereby finally improving the sound quality of the speaker 1 in the electronic device 2.

The speaker 1 provided by the embodiments of the present invention is applicable especially to an edge of a thin electronic device 2, and it has strict constraints on the area the sound-outlet hole 22 of the electronic device 2.

Figure 3:
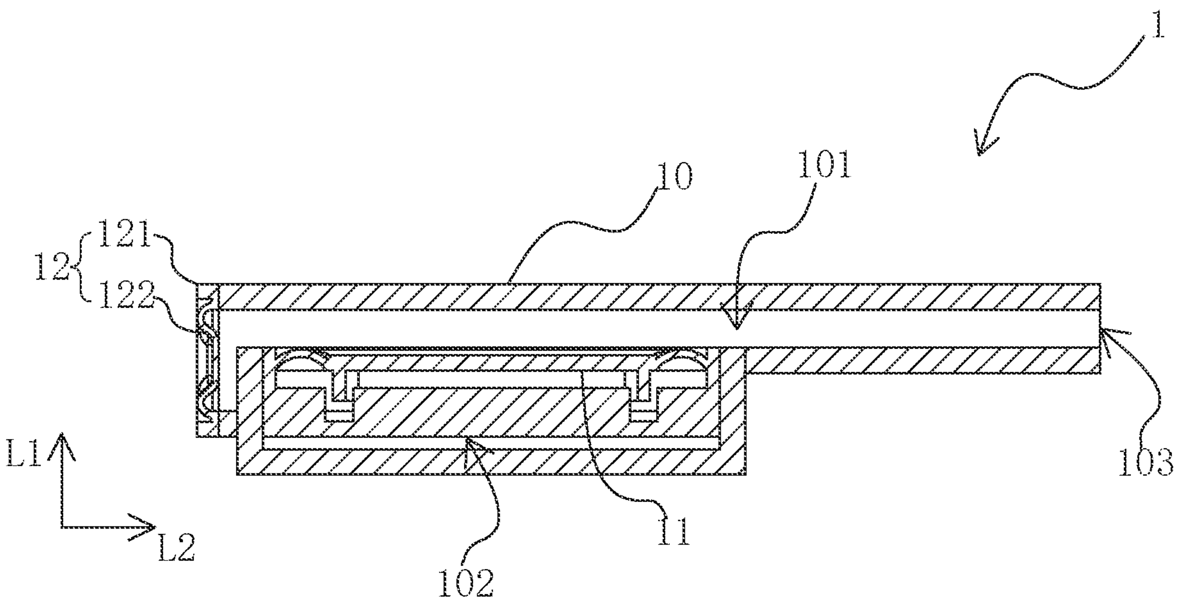
FIG. 3 illustrates a schematic cross-sectional view along A-A shown in FIG. 2 according to an embodiment of the present invention.
Figure 4:
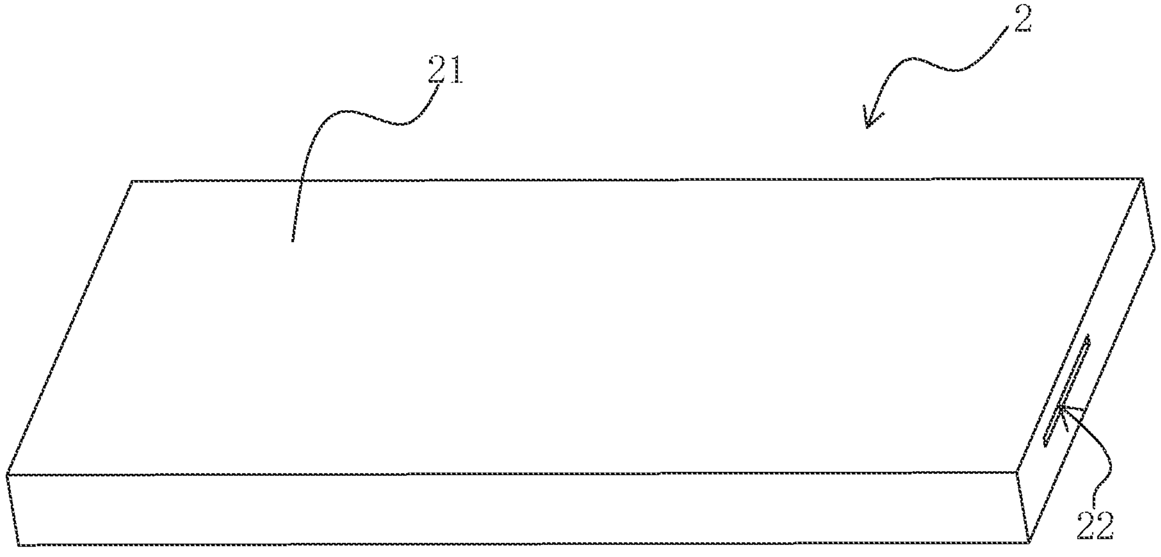
FIG. 4 illustrates an axonometric view of an electronic device having a speaker of a first structure according to an embodiment of the present invention.
Figure 5:
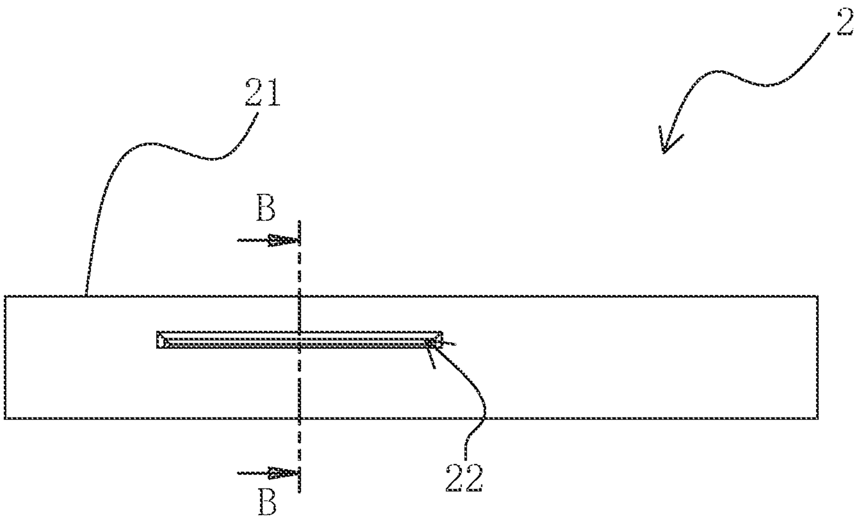
FIG. 5 illustrates a side view of an electronic device having a speaker of a first structure according to an embodiment of the present invention.
Figure 6:
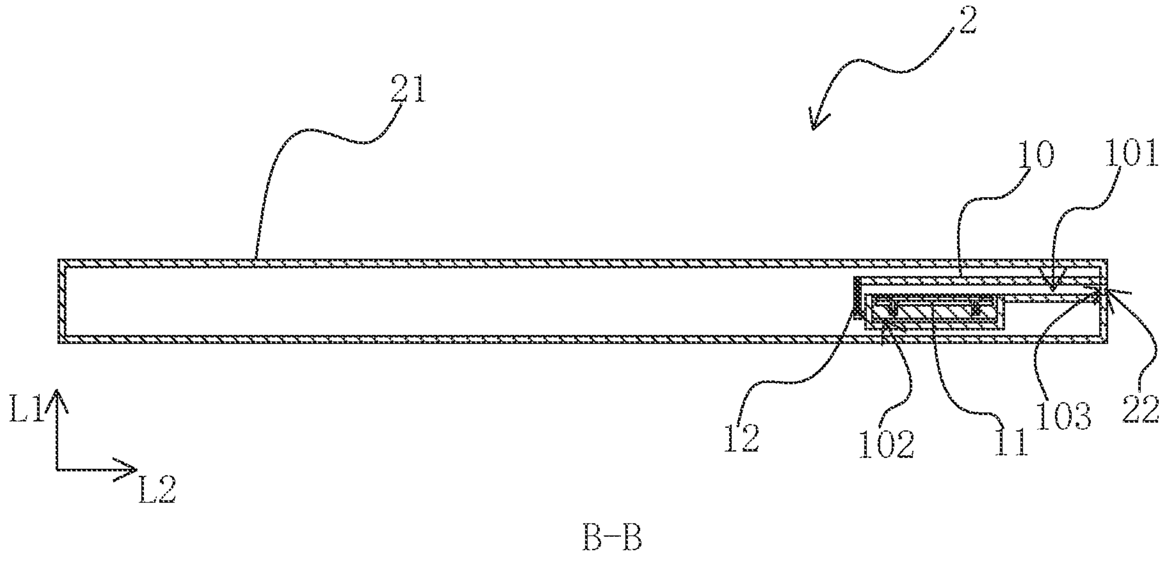
FIG. 6 illustrates a schematic cross-sectional view along B-B shown in FIG. 5 according to an embodiment of the present invention.
Figure 9:
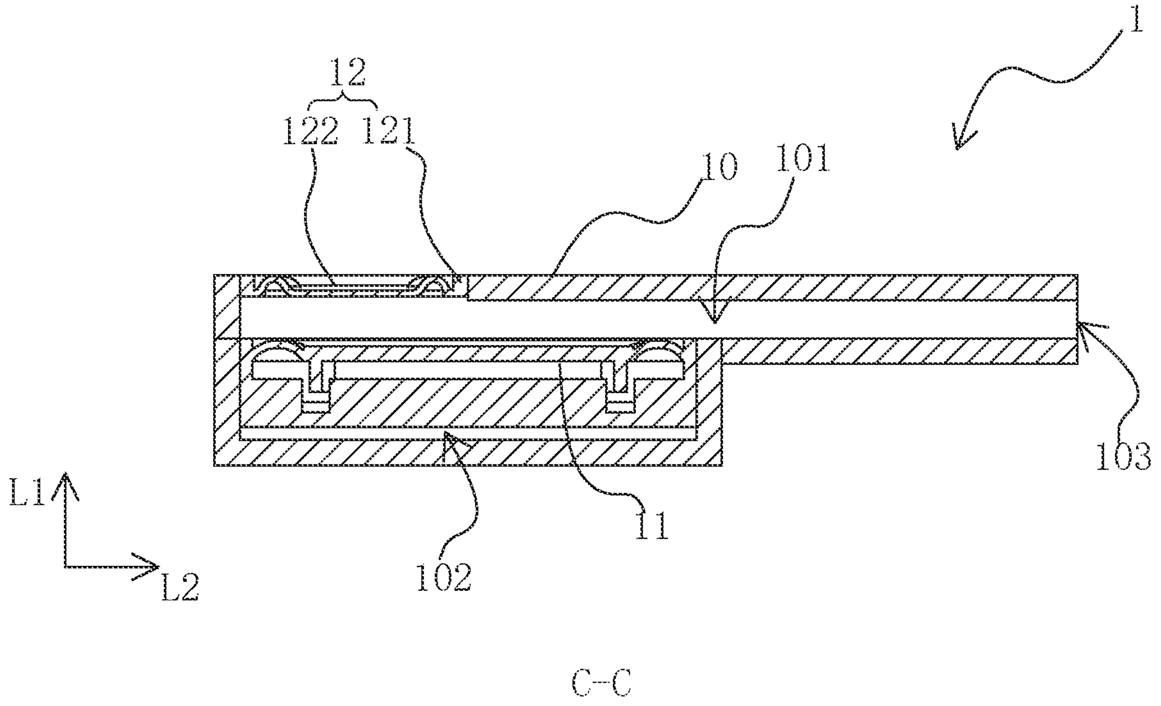
FIG. 9 illustrates a schematic cross-sectional view along C-C shown in FIG. 8 according to an embodiment of the present invention.
Figure 10:
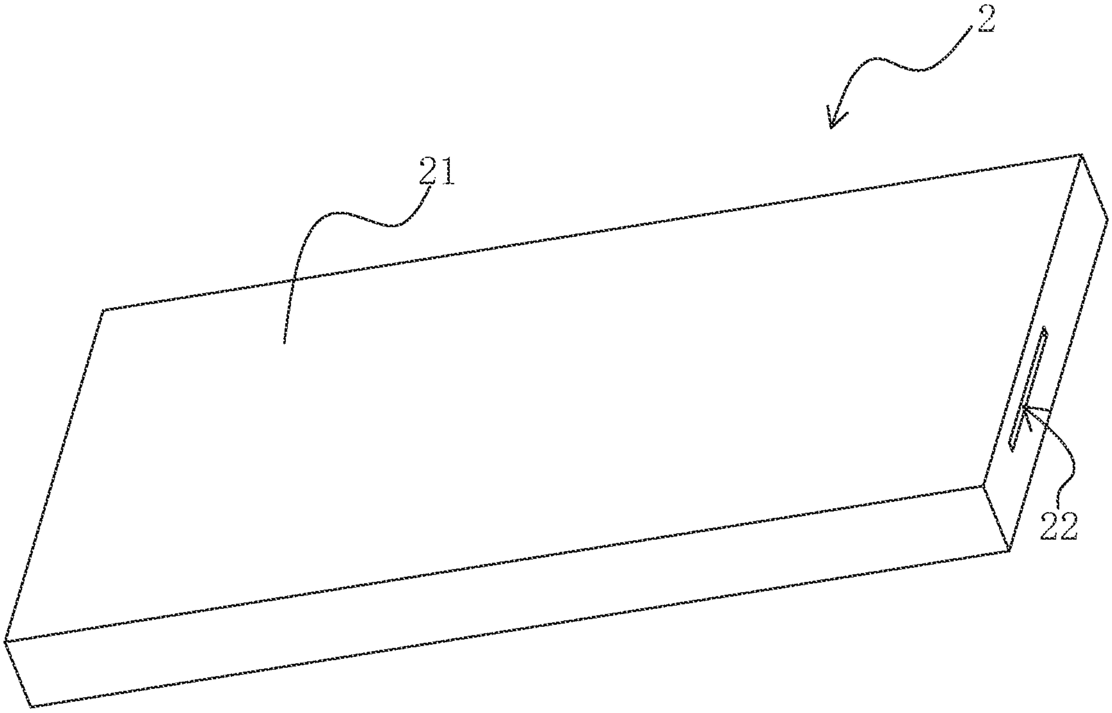
FIG. 10 illustrates an axonometric view of an electronic device having a speaker of a second structure according to an embodiment of the present invention.
Figure 11:
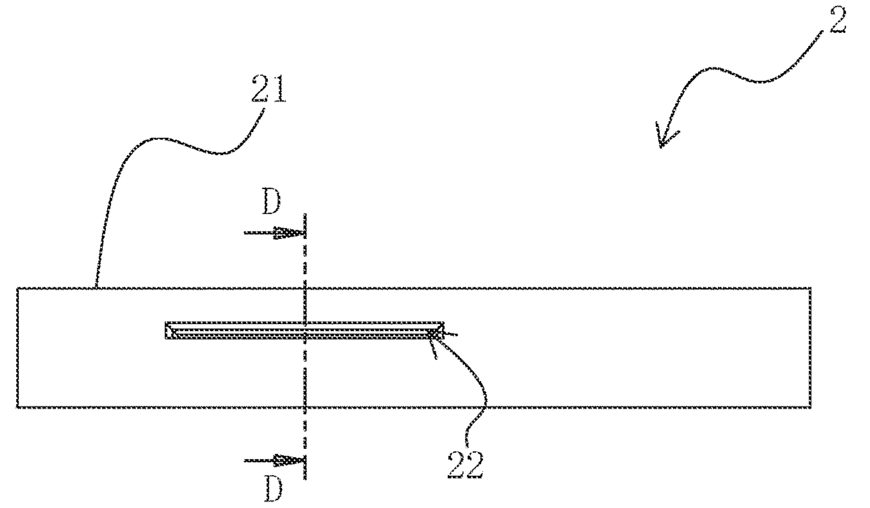
FIG. 11 illustrates a side view of an electronic device having a speaker of a second structure according to an embodiment of the present invention.
Figure 12:
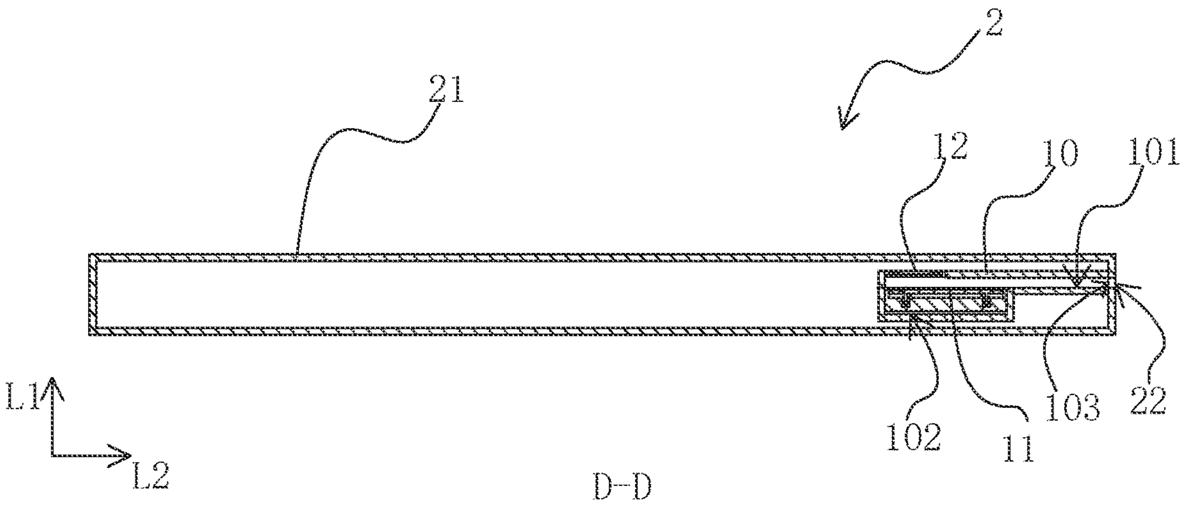
FIG. 12 illustrates a schematic cross-sectional view along D-D shown in FIG. 11 according to an embodiment of the present invention.

In the embodiments of the present invention, the speaker hole 103 is disposed in a normal direction of the vibration direction of the speaker body 11. In the first direction L1, the inner cavity is divided into an upper portion and a lower portion by the speaker body 11. The front sound cavity 101 and the rear sound cavity 102 are disposed at two opposite sides of the speaker body 11 along the first direction L1. Referring to FIG. 3 and FIG. 9, the front sound cavity 101 is disposed above the speaker body 11, and the rear sound cavity 102 is disposed below the speaker body 11. The front sound cavity 101 extends along the second direction L2. The speaker hole 103 is located at an end of the front sound cavity 101 away from the speaker body 11. The resonator 12 is disposed close to the speaker body 11 and away from the speaker hole 103. A position and an orientation of the resonator 12 have various options, and several common structures are listed below. It should be understood that those skilled in the art can make more foreseeable modifications according to the speaker 1 having the following several structures.

Figure 2:
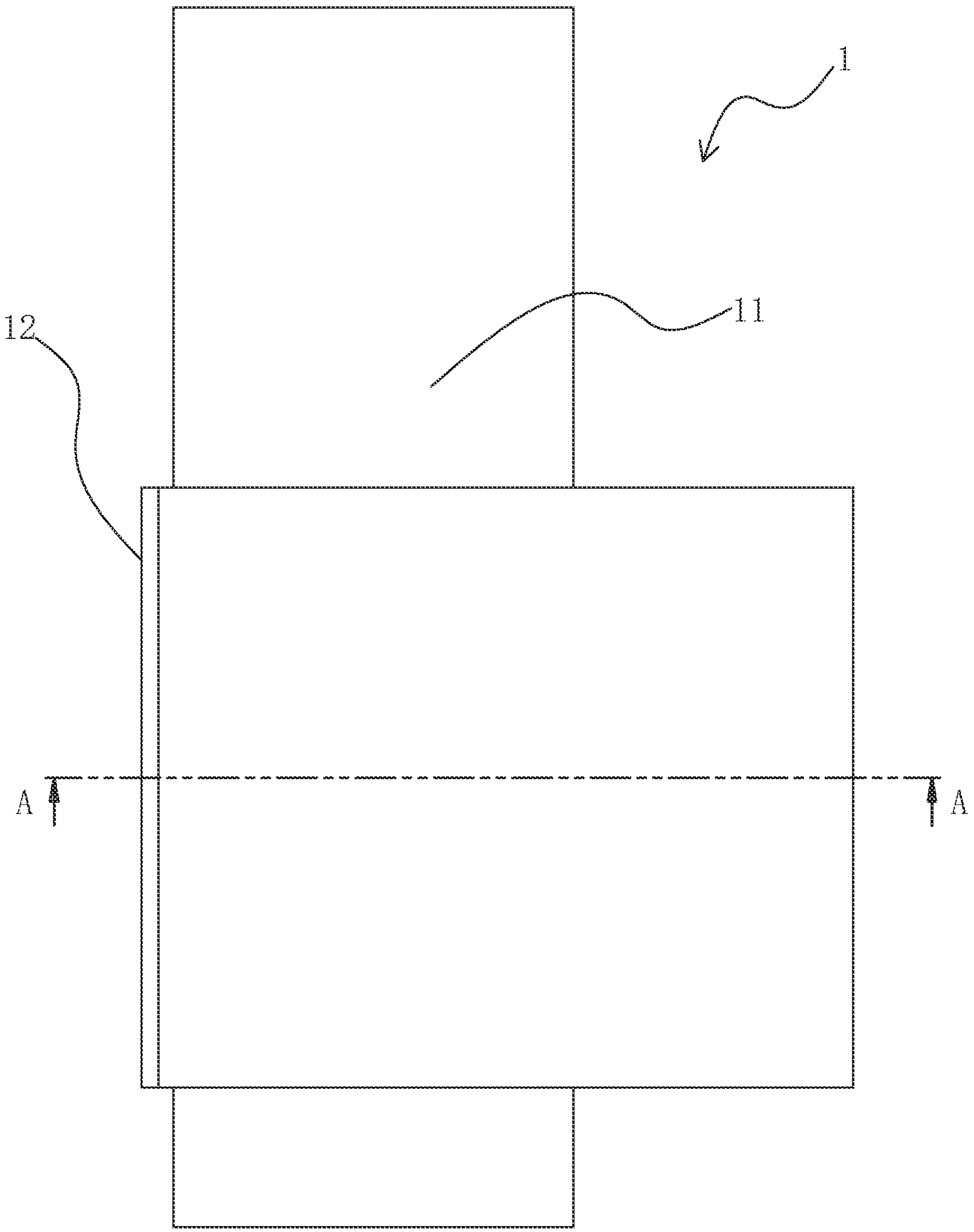
FIG. 2 illustrates a top view of a speaker of a first structure according to an embodiment of the present invention.

In a possible implementation manner, referring to FIG. 1 to FIG. 3, a speaker 1 having a first structure is provided. The resonator 12 is disposed in the direction normal to the vibration direction of the speaker body 11, and an extension direction of the composite membrane 122 of the resonator 12 is parallel to the first direction L1. In a second direction L2, the speaker hole 103 and the resonator 12 are disposed at two opposite sides of the speaker case 10, and the resonator 12 is disposed close to the speaker body 11 and located at a side of the speaker body 11 away from the speaker hole 103.

Further, in the direction normal to the vibration direction of the speaker body 11, that is, in the second direction L2 shown in the figure, an orthographic projection of the speaker hole 103 onto the speaker case 10 completely falls within an orthographic projection of the resonator 12 onto the speaker case 10. In other words, a cross-sectional area of the speaker hole 103 is smaller than a cross-sectional area of the resonator 12. The composite membrane 122 of the resonator 12 has a wider coverage area, and the acoustic impedance provided by the composite membrane 122 has a stronger attenuation effect on high modes in the axial direction of the front sound cavity 101.

Figure 7:
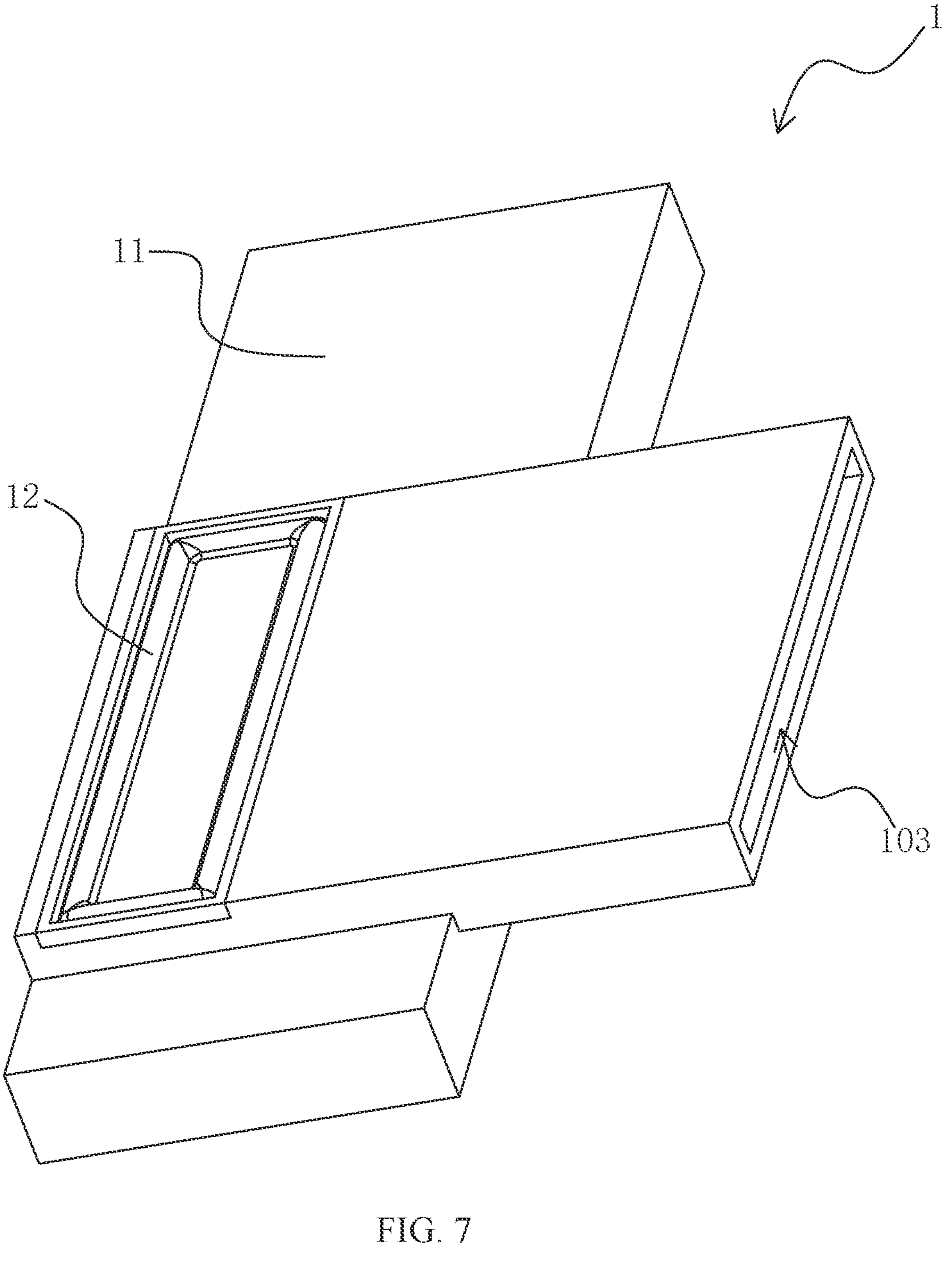
FIG. 7 illustrates an axonometric view of a speaker of a second structure according to an embodiment of the present invention.
Figure 8:
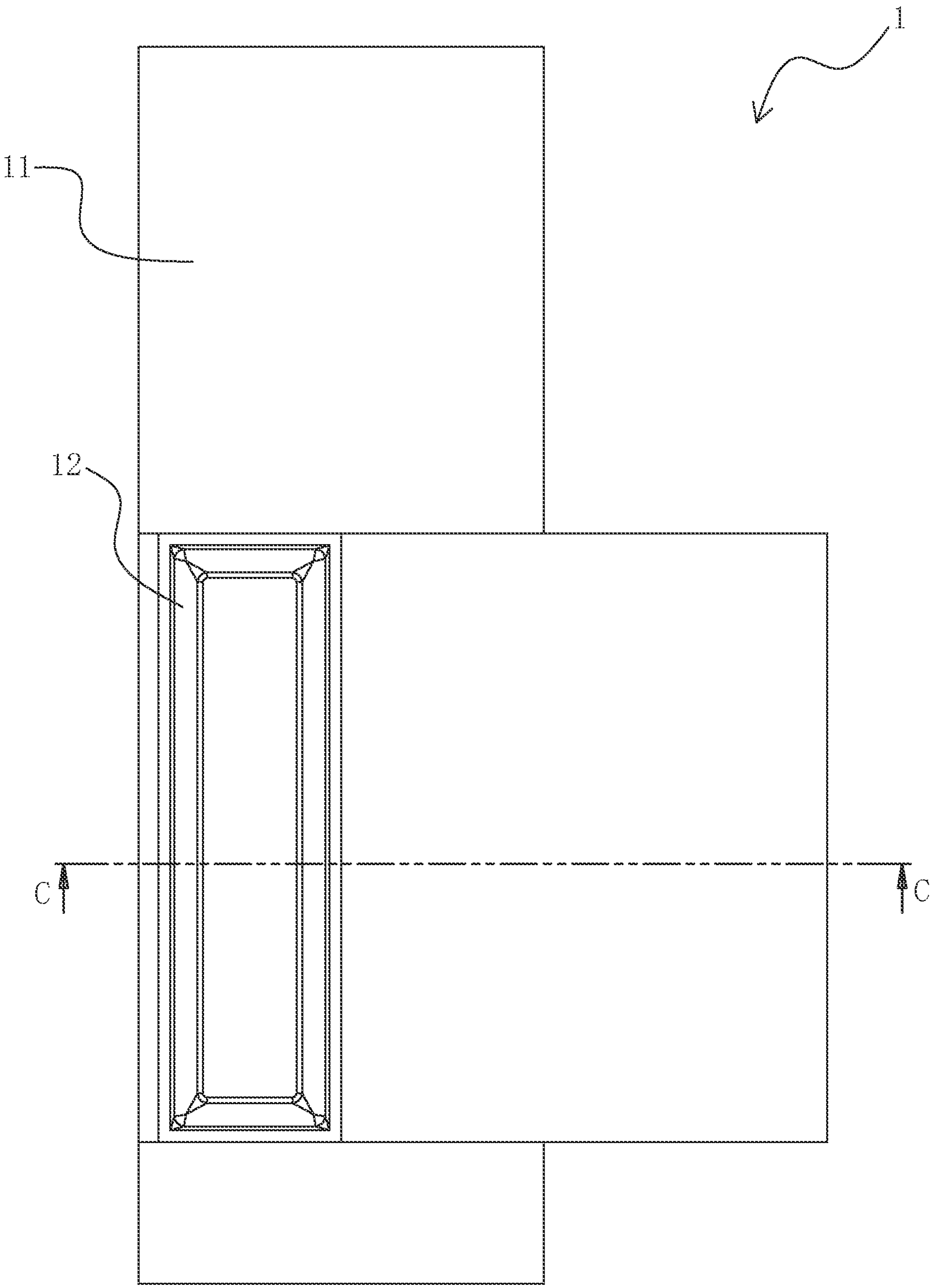
FIG. 8 illustrates a top view of a speaker of a second structure according to an embodiment of the present invention.

In a possible implementation manner, referring to FIG. 7 to FIG. 9, a speaker 1 having a second structure is provided. The resonator 12 is disposed in the vibration direction of the speaker body 11, that is, in the first direction L1 shown in the figure, and is arranged at a position opposite to the speaker body 11. In the first direction L1, the resonator 12 is located above the speaker body 11, an extension direction of the composite membrane 122 is parallel to the second direction L2, and an orthographic projection of the resonator 12 onto the speaker case 10 falls within an orthographic projection of the speaker body 11 onto the speaker case 10. When the speaker body 11 vibrates and produces sound, the resonator 12 provides acoustic impedance to the sound wave propagating in the second direction L2, and the efficiency is high.

In addition to the speaker 1 having the above-mentioned two structures, a position and an orientation of the resonator 12 on speaker case 10 may be modified in other ways. For example, the resonator 12 may be inclined, and an extension direction of the composite membrane 122 of the resonator 12 forms a predetermined angle with the vibration direction of the speaker body 11. A value range of the predetermined angle can be determined according to actual requirements, and is not limited herein. As a compromise of the orientation of the resonator 12 of the speaker 1 between the first structure and the second structure, more space can be provided for air flow outside the speaker case 10 to improve the performance.

In a possible implementation manner, a plurality of resonators 12 may be provided, to correspond to the speaker case 10 having a large area. The respective acoustic impedances provided by the plurality of resonators 12 may be the same or different from each other, and the plurality of resonators 12 may be located at a same side or different sides of the speaker case 10.

In a possible implementation manner, the resonator 12 may not be disposed directly in the front sound cavity 101, but be coupled into the front sound cavity 101 through an adapter (e.g., a short tube), thereby simplifying installation of the resonator 12.

In a possible implementation manner, the speaker is provided therein with a sound-absorbing material. The sound-absorbing material may be provided in the front sound cavity 101, and is preferably a porous structure, such as loose and porous fibers, foam particles, zeolite, and activated carbon. When the speaker body 11 vibrates, the sound-absorbing material is tuned together with a vibrating portion of the resonator 12 to produce a desired acoustic effect. The sound-absorbing material may be provided at the base 121 of the resonator 12, or may be provided in the front sound cavity 101 as a separate part.

In a possible implementation manner, the sound-absorbing material may be provided outside the front sound cavity 101, but communicate with the resonator 12.

In a case where the composite membrane 122 of the resonator 12 does not have a sufficiently high internal damping, it is beneficial to provide a sound absorbing material. Generally, the mechanical damping required for the resonator 12 to function properly is quite low, but there should be a well-defined control value. Therefore, if the mechanical damping provided by the material technology of the composite membrane 122 of the resonator 12 is not stable and/or predictable enough, a sound-absorbing material can be provided to stabilize it for proper operation of the resonator 12. The sound-absorbing material may be a thin mesh, and provided on either side of the resonator 12, especially on the opposite side of the resonator 12.

Based on the above embodiments, with reference to FIGS. 3, 5, 6, 10, 11 and 12, the present invention also provides an electronic device 2, which includes but is not limited to a mobile or fixed terminal device with a speaker 1, such as a cellphone, a tablet computer, a notebook computer, a wearable device, virtual reality equipment, a bluetooth headset, an in-vehicle device.

The electronic device 2 includes a housing 21 and the aforementioned speaker 1 installed in the housing 21. The housing 21 is provided with a receiving cavity to receive electronic devices such as batteries, camera modules, and the speaker 1. The speaker 1 is provided with a resonator 12. The resonator 12 is arranged at the speaker case 10. A side of the resonator 12 is arranged corresponding to the front sound cavity 101, and is coupled to the front sound cavity 101, so that the resonator 12 is located on a propagation path of the sound wave. Another side of the resonator 12 is exposed to the outside of the speaker case 10, i.e., is arranged to face the receiving cavity of the electronic device 2. A sound-outlet hole 22 is formed in the housing 21. A position, a shape and a size of the sound-outlet hole 22 match those of the speaker hole 103. The sound-outlet hole 22 is opposed to and communicated with the speaker hole 103. In this way, the sound generated from the speaker body 11 in the speaker 1 can be sequentially transmitted from the front sound cavity 101, the speaker hole 103 and the sound-outlet hole 22 to the outside of the electronic device 2.

The structure, features and effects of the present invention have been described in detail above according to the embodiments shown in the drawings. It should be noted that the above description merely illustrates preferred embodiments of the present invention, and does not constitute a limitation to a scope of the present invention. Any modifications, amendments, or equivalent changes based on a concept of the present invention shall fall within a scope of the present invention.

What is claimed is:

1. A speaker, comprising:

a speaker case;

a speaker body arranged in the speaker case and configured to vibrate and produce sound, wherein the speaker body divides the speaker case into a front sound cavity and a rear sound cavity, the speaker case is provided with a speaker hole, and the front sound cavity communicates with outside of the speaker case through the speaker hole; and a resonator arranged at the speaker case, including a base mounted on the speaker case and a composite membrane provided on the base; wherein a side of the resonator is arranged corresponding to the front sound cavity, and another side of the resonator is exposed to outside of the speaker case.

2. The speaker as described in claim 1, wherein the speaker hole is located in a direction normal to a vibration direction of the speaker body, and the resonator is arranged close to the speaker body and away from the speaker hole.

3. The speaker as described in claim 2, wherein the resonator is located in a direction normal to the vibration direction of the speaker body, and the speaker hole and the resonator are arranged at two opposite sides of the speaker case.

4. The speaker as described in claim 3, wherein in the direction normal to the vibration direction of the speaker body, an orthographic projection of the speaker hole onto the speaker case completely falls within an orthographic projection of the resonator onto the speaker case.

5. The speaker as described in claim 2, wherein the resonator is located in the vibration direction of the speaker body, and is arranged opposite to the speaker body.

6. The speaker as described in claim 2, wherein a predetermined angle is formed between an extension direction of the resonator and the vibration direction of the speaker body.

7. The speaker as described in claim 1, wherein a plurality of resonators is provided.

8. The speaker as described in claim 1, wherein the speaker is provided with a sound-absorbing material.

9. The speaker as described in claim 1, wherein the resonator is protected by a protection member that provides acoustic damping.

10. The speaker as described in claim 9, wherein the protection member is a mesh.

11. An electronic device, comprising:

a housing provided with a sound-outlet hole; and a speaker arranged in the housing and comprising:

a speaker case;

a speaker body arranged in the speaker case and configured to vibrate and produce sound, wherein the speaker body divides the speaker case into a front sound cavity and a rear sound cavity, the speaker case is provided with a speaker hole, and the front sound cavity communicates with outside of the speaker case through the speaker hole; and a resonator arranged at the speaker case, including a base mounted on the speaker case and a composite membrane provided on the base; wherein a side of the resonator is arranged corresponding to the front sound cavity, and another side of the resonator is exposed to outside of the speaker case, wherein the sound-outlet hole is arranged opposite to and communicates with the speaker hole.

* * * * *